May 18, 1948.                L. SCHWARZMAYR                2,441,908
                                TEAT SUPPORT
                             Filed June 9, 1943

INVENTOR:
Ludwig Schwarzmayr

Patented May 18, 1948

2,441,908

UNITED STATES PATENT OFFICE 2,441,908

TEAT SUPPORT

Ludwig Schwarzmayr, San Francisco, Calif.

Application June 9, 1943, Serial No. 490,392

4 Claims. (Cl. 31—80)

My invention relates to teat supports for milking. One object of my invention is to provide a teat support whereby the work of milking is made less fatiguing. Another object is to provide a device whereby the milk can be more quickly and thoroughly extracted from a cow.

A further object is to reduce the causes of rough treatment of the teats in milking operation.

I attain these objects by the devices illustrated in the accompanying drawing, in which—

Figures 1, 2, 3:
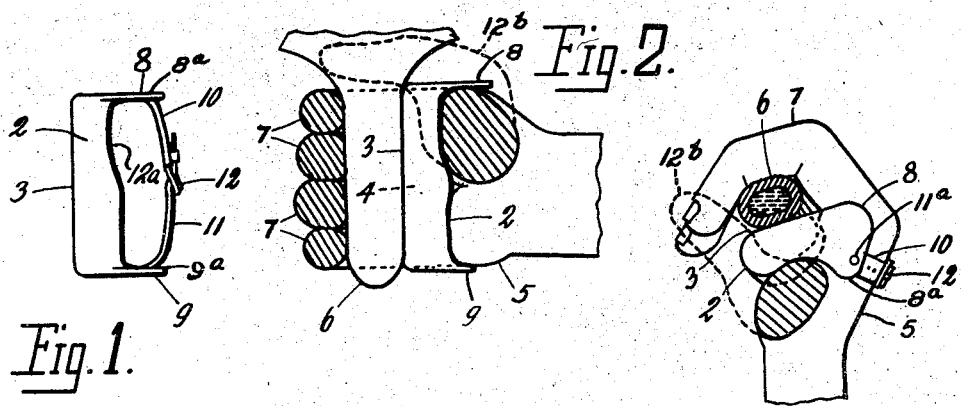
Figure 1 is the teat support in one form.
Fig. 2 shows the teat support of Fig. 1 in operative position in the palm of a hand extracting milk from a teat, the hand being partly shown in section, the position of the thumb of the hand being shown in dotted lines.
Fig. 3 is an end view of the teat support in operative position with a hand and a teat, the teat being shown in section, the hand being partly shown in section, and the position of the thumb being shown in dotted lines.

The teat support has a body 2 of a smooth teat supporting surface 3, and is adapted to the half closed palm 4 of the hand 5, and supports the teat 6 spaced from the palm 4 of the hand, so that the fingers 7 can extract the milk from the teat at an extent of inward movement where the operating muscles are most powerful and less subject to fatigue than when operating the fingers at the extreme inner extent of movement. From the ends of the body 2 extend rigid flanges 8 and 9 which retain the teat support against displacement, and on the extended ends 8ª and 9ª of the flanges 8 and 9 are secured the straps 10 and 11 by any conventional means, a rivet 11ª in the present instance. One of the straps is provided with a buckle 12 for adjustment so that the straps securely hold the teat support to the palm of the hand. The inner surface 12ª of the body is of a contour corresponding with that of the palm of the hand of the user when in operative position so that the body 2 is held in place during milking operation. The teat engaging face 3 of the body is straight vertically so as to provide a uniform support for the teat throughout its entire length when the fingers 7 close in succession starting with the index-finger so that the milk is thoroughly extracted from the teat. The position of the thumb is shown in dotted lines 12ᵇ.

The extreme inward extent of movement of the fingers in extracting the milk from the teat makes the work very fatiguing, therefore by supporting the teat in a position where the fingers extract the milk without an extreme inward movement the work of milking is made more easy. The smooth surface of the body 2 provides an even support for the teat, thereby it cooperates much better with the fingers in extracting milk than the palm of a hand does, and thereby the milk can be extracted more thoroughly and without abuse to the teat.

Figure 5:
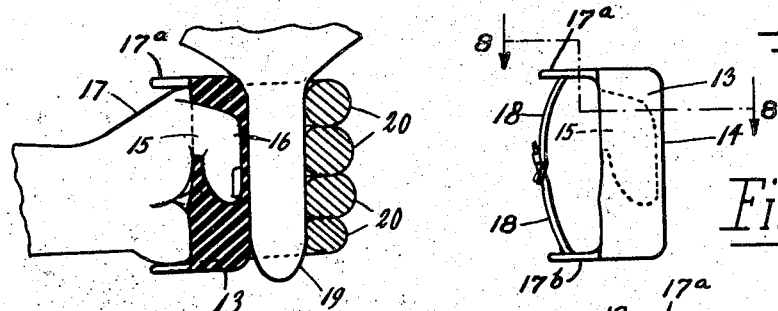
Fig. 5 is a sectional view of the teat support shown in Fig. 4, and the support being in operative position with a teat and a hand, the fingers of the hand being shown in section.
Figures 4, 8:
Fig. 4 shows a modified form of the teat support.
Fig. 8 is a section on line 8—8, Fig. 4.

Figs. 4, 5 and 8 show the teat support in a modified form. The teat support 13 has a smooth teat engaging surface 14, and has a cavity 15 at the inner side to accommodate the thumb 16 of a hand 17. The straps 18 hold the teat support to the palm of the hand and in operative position with the thumb 16. The straps 18, 18 are secured to the flanges 17ª and 17ᵇ in any conventional manner, a rivet 18ª is shown in the present instance. The thumb 16 adjusts and retains the teat support 13 in position so as to provide a firm support for the teat 19 when engaged by the fingers 20. The flanges 17ª and 17ᵇ are secured to the teat support 13 in any conventional manner, not shown in the drawings.

Figures 6, 7:
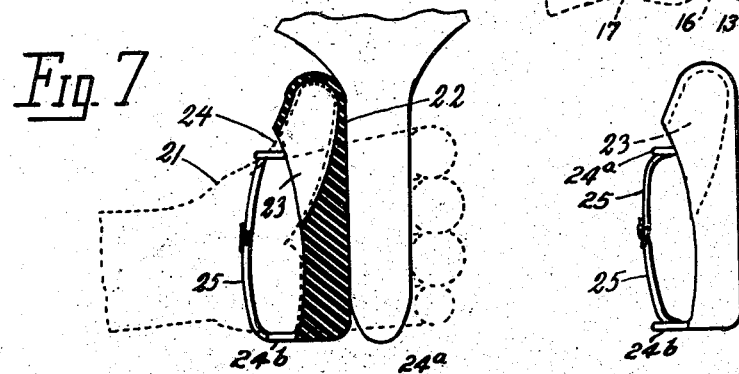
Fig. 6 shows another modified form of the teat support.
Fig. 7 shows the teat support of Fig. 6 in section, the support being in operative position with a teat and a hand, the hand being shown in dotted lines.
Figure 9:
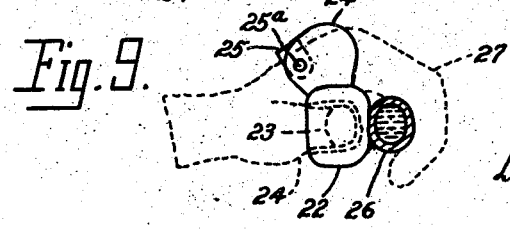
Fig. 9 is a plan view of the teat support shown in Fig. 7, the teat being shown in section and the hand in dotted lines.

Figs. 6, 7 and 9 show a modified form of the teat support, the hand being shown in dotted lines 21. The teat support 22 is made of flexible rubber and in its inner side has a cavity 23 for accommodating an upward extending thumb 24 of a hand. To the flanges 24ª and 24ᵇ are secured the straps 25, 25 by a rivet 25ª. The straps hold the teat support to the palm of a hand and in operative position with the thumb in the cavity 23. As is shown in the drawing the cavity 23 is elongated and tapered toward its end so that when the thumb is forced therein the teat supporting body 22 is firmly attached thereto so as to assure its control with respect to the teat 26 and the fingers 27. The rigid flanges 24ª and 24ᵇ are secured to the teat support 22 in any conventional manner, not shown in the drawings. The smooth teat supporting surface of the device greatly reduces the often occurring irritation of the teat caused by rough treatment.

I claim:

1. A teat support comprising an elongated teat supporting body having a smooth vertically straight teat engaging face and a hand engaging inner side of a contour corresponding with the contour of the palm of the hand of the user when in operative position, and a rigid flange extending laterally from the upper end of said body to extend transversely across the edge of the hand of the user to retain the inner side of said body in position with its contour corresponding with that of the palm of said hand.

2. A teat support comprising an elongated teat supporting body adapted to engage the palm of the hand of the user and having a smooth teat engaging face on its outer side and an elongated cavity in its inner side to receive the thumb of said hand for controlling the position of said body with respect to a teat and the fingers of said hand.

3. A teat support comprising an elongated teat supporting body adapted to engage the palm of the hand of the user and having a smooth teat engaging face on its outer side and a cavity in its inner side to receive the thumb of said hand, and a rigid flange extending laterally from said body to extend transversely across the edge of said hand to retain said thumb in operative position in said cavity.

4. A teat support comprising an elongated teat supporting body adapted to engage the palm of the hand of the user and having a smooth teat engaging face on its outer side and a cavity in its inner side to receive the thumb of said hand, and a retaining strap associated with said body and arranged substantially opposite to said cavity and adapted to engage the back of said hand to retain said body in operative position with said thumb.

LUDWIG SCHWARZMAYR.

REFERENCES CITED

The following references are of record in the file of this patent:

UNITED STATES PATENTS

| Number | Name | Date |
|---|---|---|
| 675,414 | Roth | June 4, 1901 |
| 901,335 | Gallup | Oct. 20, 1908 |
| 966,641 | Atkison | Aug. 9, 1910 |
| 975,734 | Tebeau | Nov. 15, 1910 |
| 1,193,529 | Ellis | Nov. 8, 1916 |
| 1,607,022 | Swinburne | Nov. 16, 1926 |
| 2,077,202 | Barrie | Apr. 13, 1937 |